Nov. 13, 1962 M. V. KALFAIAN 3,064,240

SYMMETRIC SAW-TOOTH-WAVE GENERATOR FOR USE AS CATHODE-RAY TUBE SWEEP IN FREQUENCY CONVERSION SYSTEMS

Filed Dec. 3, 1959 4 Sheets-Sheet 1

INVENTOR.

Meguer V. Kalfaian

Nov. 13, 1962 M. V. KALFAIAN 3,064,240

SYMMETRIC SAW-TOOTH-WAVE GENERATOR FOR USE AS CATHODE-RAY TUBE SWEEP IN FREQUENCY CONVERSION SYSTEMS

Filed Dec. 3, 1959

4 Sheets-Sheet 2

INVENTOR.

Migran V. Kalfaian

Nov. 13, 1962 M. V. KALFAIAN 3,064,240

SYMMETRIC SAW-TOOTH-WAVE GENERATOR FOR USE AS CATHODE-RAY TUBE SWEEP IN FREQUENCY CONVERSION SYSTEMS

Filed Dec. 3, 1959 4 Sheets-Sheet 3

INVENTOR.

Meguer V. Kalfaian

Nov. 13, 1962 M. V. KALFAIAN 3,064,240

SYMMETRIC SAW-TOOTH-WAVE GENERATOR FOR USE AS CATHODE-RAY TUBE SWEEP IN FREQUENCY CONVERSION SYSTEMS

Filed Dec. 3, 1959 4 Sheets-Sheet 4

INVENTOR.

Mayer V. Kalfaian

United States Patent Office 3,064,240

Patented Nov. 13, 1962

3,064,240

SYMMETRIC SAW-TOOTH-WAVE GENERATOR FOR USE AS CATHODE-RAY TUBE SWEEP IN FREQUENCY CONVERSION SYSTEMS

Meguer V. Kalfaian, 962 Hyperion Ave., Los Angeles 29, Calif.

Filed Dec. 3, 1959, Ser. No. 857,121
11 Claims. (Cl. 340—172.5)

Figure 1:
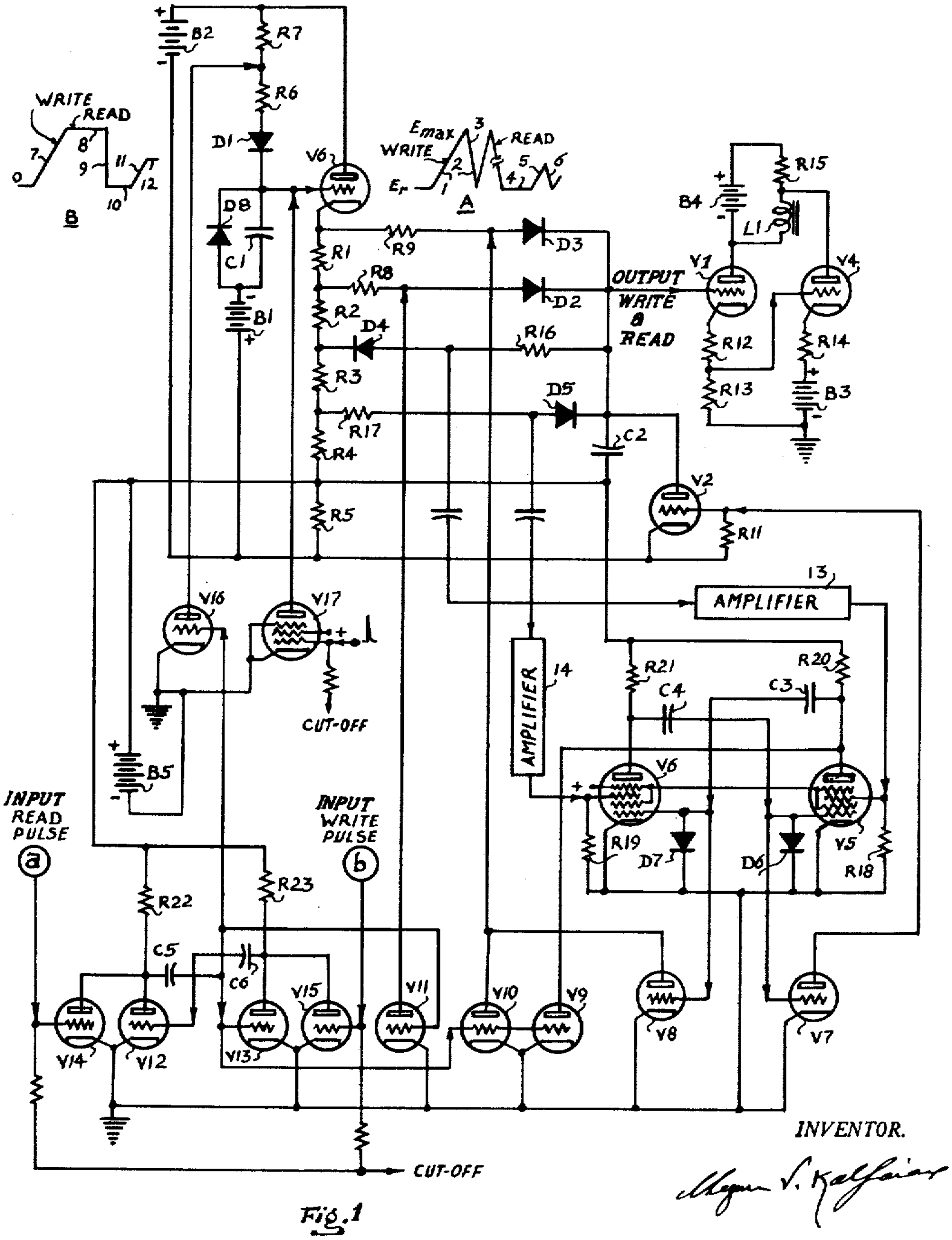

This invention relates to the production of scanning sawtooth waves, and particularly in a system of shifting variably changing basic resonances in speech sound waves to predetermined reference frequency regions, for phonetic analysis of the spoken sound. The present invention particularly an improvement over the systems disclosed in my U.S. Patents No. 2,705,260, March 29, 1955; No. 2,708,688, May 17, 1955; and patent application Serial No. 723,510, March 24, 1958, now Patent No. 2,921,133, January 12, 1960. Its main object is to provide improved method and system of scanning to be utilized in conjunction with the system disclosed in my Patent No. 2,708,-688, or copending application Serial No. 723,510, now Patent No. 2,921,133, for standardizing the frequency positions of the basic resonances of the propagated speech sound waves, prior to analysis, for final translation into visible intelligible indicia, for example, by electric typing devices. A further object of the present invention is to provide a system for producing frequency conversion scanning waves, to be used in conjunction with cathode ray type storage tubes, in the form of symmetric forward and backward scanning sawtooth waves for reproduction of a recorded wave. This mode of scanning is contemplated as an improvement over the conventional mode of scansion, the latter of which provides reproducing sawtooth waves only in forward direction with retrace, or flyback, actions in between the sawtooth waves.

In order to distinguish between the presently proposed mode of scanning and the conventional mode of scanning having retrace time lag periods, consider for one example, that a complex waveform having equal signal levels at its beginning and ending is recorded along a single line across the screen of a cathode ray type of storage tube. When this recorded wave is reproduced several times continuously by conventional sawtooth scanning waves having retrace time lag periods, contiguity between each reproduced waveform is broken by the retrace periods, which may deviate from the original accuracy with regard to frequency components contained; when critical narrow band pass circuits are involved. In a second example, assume that the signal levels commencing and terminating the recorded complex waveform are widely different. In this case, even if the retrace time periods of the scanning waves were zero, there will occur sudden changes in signal levels, which when oppositely poled, will cause high filtering action through the associated narrow band pass circuits; this filtering action varying intermediately depending upon the differences in signal levels at the beginning and ending of the recorded waveform.

The recorded complex waveform is herein referred to as representation of some sound in intelligence, for example, in speech sound waves. As such recording may be a portion of a repetitious sound wave, to be reproduced continuously at a later time period, for example, after being transmitted through a narrow band transmission channel, it does not matter whether the recorded wave is scanned in forward or in backward direction, or further yet, alternately in forward and backward directions. This condition is true, because intelligence of the sound is not transmitted through phase variations of the wave, but through its various frequency components, which would not alter through the latter mode of scanning. Thus instead of utilizing reproduction sawtooth waves having only forward direction, and including retrace time periods between repetitions, we may use symmetric forward and backward sawtooth waves, with complete elimination of the retrace periods. By such mode of scanning, an associated narrow band pass circuit would not see a sudden change in signal level either at the beginning or at the ending of the reproduced waveform, and therefore, avoid any filtering action. This latter mode of scansion may not be considered as ideal, because the wave curve at the beginning or ending of the recorded waveform may not be tangential at all times, and the sharp reversal of signal at these points may introduce some unwanted frequency components in the output circuit; but these components will be of small magnitudes in comparison with the effects introduced in conventional mode of scanning, and therefore they may be considered as negligible.

In the particular embodiment of the present invention, the time period of a waveform to be recorded is not predicted beforehand, and accordingly, the distance of recording, for example, across the screen of a storage type cathode ray tube, may vary widely for each recording. For example, as described in my above mentioned Patent No. 2,708,688, each phonetic sound in speech consists of a definite set of resonances whose ratios in frequency positions with respect to a fundamental remain constant, no matter what band of the voice spectrum they are produced in. Since these fundamental frequencies (pitch of the voice) vary widely in different voices, the purpose is to select and record each waveform contained in one cycle portion of these fundamental time periods, and reproduce them continuously in a standard time base period, so that by such standardization of the original variations of the voice, standard sets of parameters may be derived to collectively define different phonetic sounds of the spoken words, for the purpose of synthesizing same. One of the minor difficulties that may be encountered with, however, is the varying time periods during which multiple reproduction of the original recorded wave may be performed. Since the time lapse for the arrival of a succeeding waveform of the propagated speech sound waves cannot be predicted, the number of reproductions for each recorded waveform, or wave pattern, will vary widely. When different frequency components of the reproduced waveform are to be selected by narrow band pass circuits, the build-up of oscillatory waves through these circuits may be less during only few repetitions of said recorded wave, than when many more of said reproductions were allowed during a longer time period. Accordingly, and with reference to above given explanation and the advantages with respect to conventional modes of scansion, the present invention contemplates to first provide means for producing a recording sawtooth scansion wave rising from a reference point. During this recording scansion of the incoming waveform, a signal voltage is proportionally derived and stored, the quantity of which represents the time dimension of the recording sawtooth wave; for further control. Further means is provided for producing symmetric scanning sawtooth waves, the amplitudes of which are controlled by said stored quantity, in a manner that, they scan the recorded wave begining from the same reference point to the ending of the record; and backward alternately. Still further means is provided to stop the reproduction of said recorded waves after a predetermined number of counts.

In one practical system, there may be used two storage tubes of the cathode ray type, in a manner that the wave pattern contained in one cycle portion of the selected fundamental (during propagation of the sound waves) is recorded in one storage tube, and the wave pattern contained in the following one cycle portion of the selected fundamental is recorded in the other storage tube. While the first recording is processed, its time length (from inception to termination of the wave pattern) is measured and stored in the form of a first signal quantity. Then, while the second recording is processed, the first recorded wave pattern is reproduced under control of the first quantity, so adjusted that the first recorded wave pattern is reproduced in a predetermined standard time base period. The same process is repeated with the second recorded wave pattern, so that the end result is a cyclic reproduction of the wave pattern of the propagated sound wave at a standard time base period. In order to allow time for reproduction of the recorded wave patterns prior to the arrival of successive wave patterns, the standard time base period is adjusted to be several times shorter than the shortest time base period occurring in ordinary speech sound waves. Thus, the number of reproduced wave patterns will be many more than the actual recorded wave patterns; but by stopping these reproductions after predetermined number of counts, as mentioned in the foregoing, more accurate resonance analysis of the wave patterns may be accomplished. Further references may be made to my copending applications Serial No. 773,064, November 10, 1958, now Patent No. 2,942,198, and No. 2,781,103, December 17, 1958, which are pertinent to the presently proposed system. Thus, it is more desirable to energize the frequency selecting resonant circuits during reproduction of a wave pattern, and dissipate rapidly prior to selection of the resonances of a succeeding wave pattern. Also, the repeated reproduction of the recorded wave pattern does not have to be continually in forward direction, and accordingly, a back and forward sweeping scanning system may be utilized, with greater advantage of avoiding any time lost during retrace period. Such time lost during retrace period may randomly cause sudden phase reversal of the reproduced wave pattern, and prevent proper energization of said pre-tuned resonant circuits by way of heavy filter action. Further yet, if the number of wave pattern reproduction is random, and less than the band pass of said pre-tuned resonant circuits, the amplitude built-up in said resonant circuits, for each phonetic sound, may not be the same for different pitched voices. It is therefore more desirable to standardize the number of reproduction of a recorded wave pattern. Accordingly, it is the principal object of the present invention to provide a frequency conversion scanning system for first recording a wave pattern of the speech sound wave during propagation of same, and reproducing the recorded wave repeatedly in forward and backward sweeping directions at a predetermined reference time base period, including means for stopping said reproduction after reaching a predetermined number of counts.

Briefly in accordance with the embodiments of the invention, there is provided a method which comprises the steps of producing a recording scanning wave rising in energy from a minimum-magnitude reference level, the maximum level of last said wave representing the time dimension during which said recording occurs; producing repeated reproduction scanning waves at constant predetermined reference time base periods alternately falling and rising in energy coincident in magnitude with said reference-minimum and maximum energy levels of the recording scanning wave; and stopping said reproduction waves after a predetermined number of counts.

Figure 3:
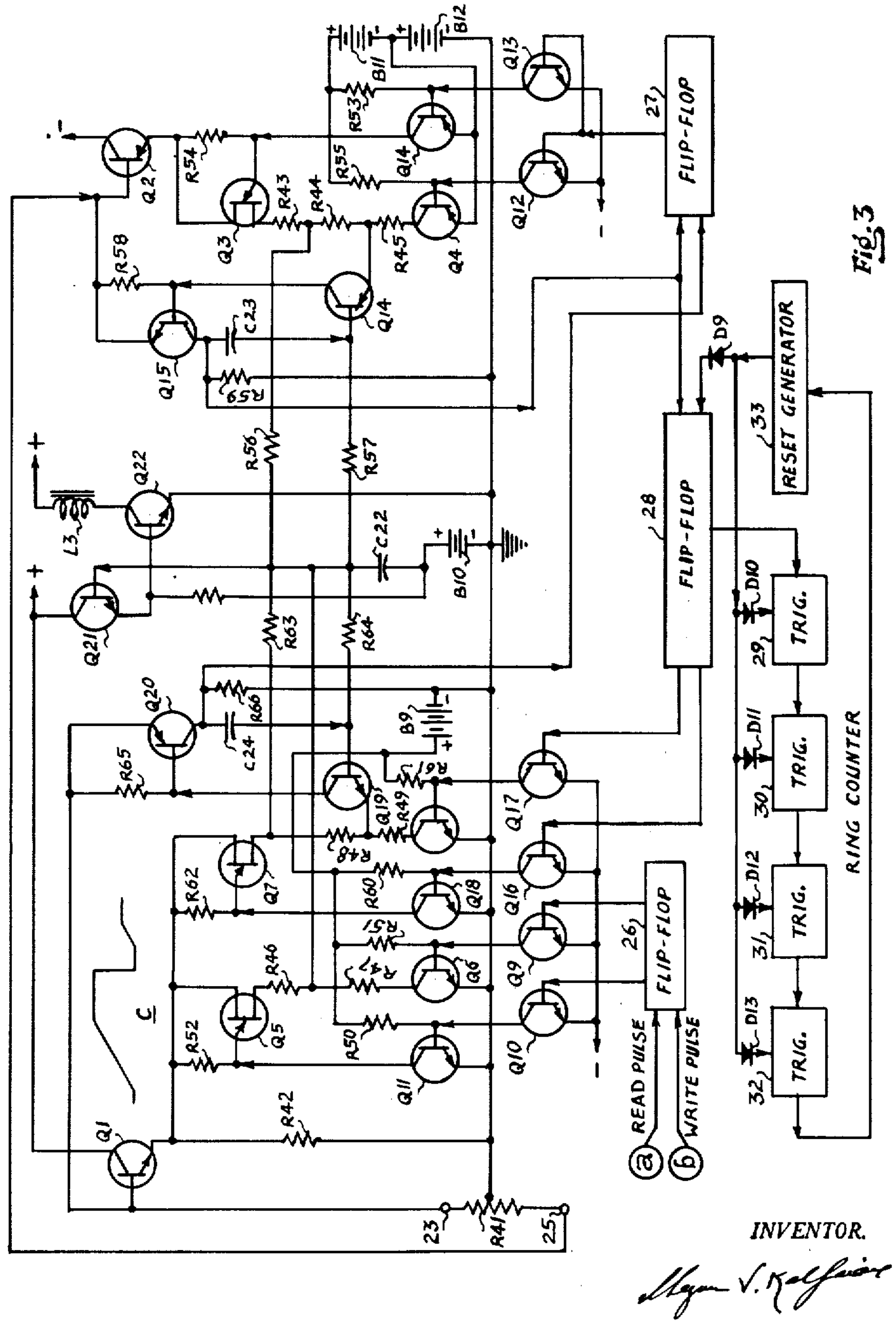
Figure 4:
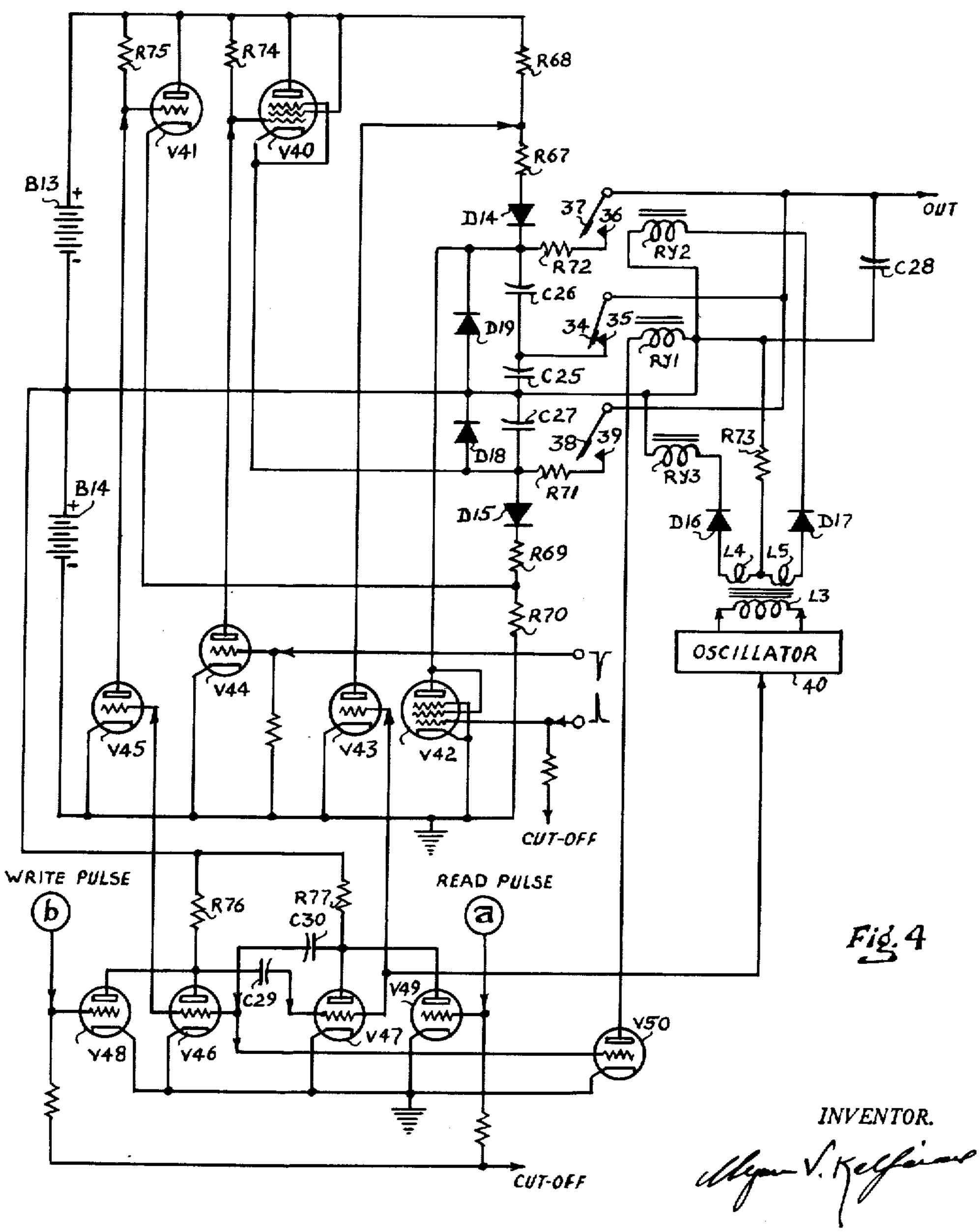

For a further understanding of the objects and features of this invention, reference is now made to the following detailed specification of certain schematic arrangements showing the preferred mode of carrying it into useful application, and the claims appended hereto will then define the invention not only as embodied in these exemplary arrangements, but also in a scope to embrace various other arrangements which it is capable of assuming in practice. The accompanying drawings comprise FIG. 1 and FIG. 2, which in combination constitute a frequency conversion scanning system according to the invention. FIG. 3 is a transistorized version of the arrangement in FIG. 1, according to the invention. And FIG. 4 is a further modification of the system according to the invention.

Referring now to FIG. 1, the scanning waveform A illustrates the mode of recording and reproducing a wave pattern of the speech sound waves. The sweeping wave 1 represents the recording, or *write*, sawtooth voltage, rising from a minimum reference voltage $E_r$ to a maximum voltage $E_{max}$. After the wave pattern is written during *write* time, symmetric saw teeth voltages 2, 3, etc., are produced during reproduction, or *read* time, at repetition of a reference frequency rate. The fall 2 and rise 3 of these symmetric saw teeth voltages are produced in equal amplitudes as of the sawtooth voltage of 1, and their minimums and maximums coincide with that of $E_r$ and $E_{max}$. After a predetermined number of *read* saw teeth voltages are produced, they are stopped during waiting period 4, until a new writing sawtooth voltage 5 is produced, the latter of which may have a different amplitude than the voltage of 1; the rate of rise of voltages 1 and 5, however, being always constant. After the writing scan voltage 5 is produced, the *read* scan voltages 6 follow in the previously explained manner. The reference minimum voltage $E_r$ may be zero, but due to various undesired conditions of electron tubes used in the circuit arrangement, it may assume a reference minimum voltage, which is of no consequence as long as the *read* voltage waves have the same minimum reference values. Furthermore, a large reference voltage $E_r$ of opposite polarity from $E_{max}$ may sometimes be necessary in the case where a cathode ray storage tube is employed for said *write* and *read* operations, and where the cathode beam in said tube is normally deflected to one edge of the storage screen as a reference starting point of said operations. Of course, in magnetic deflection said reference voltage may be termed as a reference current through the deflection yoke coil.

With the brief explanation of the presently proposed scanning system, by way of the graphical illustration at A in FIG. 1, reference is now made to the schematic arrangement, wherein, the voltage waves at A are first produced across series connected resistors R1 through R5, all connected in the cathode circuit of cathode follower tube V1. The control grid of V1 is connected to its cathode in series with storage capacitor C1, bias battery B1, and in series with the resistors R1 to R5. With zero voltage across capacitor C1, the bias B1 is adjusted for minimum current through the tube V1. The writing sawtooth voltage across C1 is produced by charging it across battery B2, in series with diode D1 and series connected resistors R6, R7. During *write* time, the capacitor C1 is made to charge across battery B2 linearly in series with R6 and R7; only the portion of linear rise being utilized by prearrangement. As capacitor C1 charges from a zero voltage value, the same linear rise in voltage appears across the series connected cathode resistors R1 to R5 of tube V1. At the instant when a wave pattern of the speech sound wave being written is ended, a large negative voltage is applied at the junction point of resistors R6 and R7, causing the charge in capacitor C1 to stop, by way of the polarized diode D1; thus C1 holding its last acquired potential in steady state thereafter. The voltage waveform across C1 is illustrated by the graphical drawing at B, wherein, 7 represents the voltage rise from zero value during *write* period; 8 represents steady state potential, during *read* period, equal to the maximum of rising voltage 7; 9 represents sudden discharge of the voltage in C1 after said *read* period; 10 represents the waiting period (as 4 at wave A); 11 represents a following rise in voltage for another writing of a wave pattern of the sound wave, but in this case the maximum voltage being different than the maximum of rising voltage 7; and 12 represents the holding voltage of wave 11 during *read* period, etc. Because of the cathode follower action of tube V1, the exact voltage waveform of B appears across the cathode circuit series resistors R1 through R5.

A capacitor C2, across which the final scanning wave voltages are to be produced, is directly connected one of its terminals to the junction point between resistors R4 and R5, and its other terminal is connected to the junction point between resistors R1 and R2 in series with polarized diode D2 and resistor R8, and to the cathode terminal of tube V1 in series with polarized diode D3 and resistor R9, and further, it is connected to the end terminal of resistor R5 in series with polarized tube V2 and resistor R10. The function of such an arrangement is to form a switching sequence for the production of the required scanning voltage waves, as in the following:

During *write* time, a high negative voltage is applied at the junction point of diode D3 and resistor R9 so as to prevent any current passing through diode D3 to the capacitor C2, and also a high negative voltage is applied across resistor R11 so as to render the tube V2 inoperative. As the cathode voltage of tube V1 increases in positive direction, the capacitor C2 charges positively equal in rise of potential as appears at the junction point between resistors R1 and R2, in series with diode D2 and resistor R8. As explained by way of the graphic illustration at A, the writing time period of wave 1 is always longer than the reading periods of waves 2, 3, etc. Accordingly, the value of series resistor R8 may be so adjusted that there will be no lagging of the charging voltage across C2 with that of the rising voltage at junction point between resistors R1 and R2. Thus during *write* period, the scan voltage at the junction point between resistors R1 and R2, may be successfully transferred to capacitor C2. During the entire *read* period, a high negative voltage is applied at the junction point between diode D2 and resistor R8, so that the capacitor C2 is no longer affected by the voltage at junction point between R1 and R2. At this *read* period, however, the high negative voltages across resistor R11 and at the junction point between D3 and resistor R9 are alternately removed, for the production of the *read* saw-teeth waves, as in the following:

After the *write* period, when the diode D2 is rendered inoperative, the negative bias voltage upon the control grid of tube V2 (from across R11) is removed, so that the tube V2 is rendered conductive to discharge the capacitor C2 in series with timing resistor R10. The value of resistor R10 is preadjusted, so that the discharge period of capacitor C2 is equal to the *read* period, as shown by the waves 2, 3, 6, etc., in the graphical drawing of A. As known in the art of electronics, the capacitor discharge in series with a resistor is linear only during part of the discharge, and exponential thereafter. In order to counteract this exponential discharge, the positive potential of capacitor C2 is discharged in series with a negative potential, as developed across resistor R5, so that when the capacitor potential is discharged equal to the potential at the junction point between resistors R4 and R5, it starts recharging in the negative direction. Thus, the amplitude of voltage developed across resistor R5 may be so preadjusted that the discharge curve across capacitor C2 becomes linear (for practical purposes) down to the voltage residing at the junction point between resistors R4 and R5. According to the waveform illustrated at A, it is desired that the capacitor C2 starts charging in the positive direction as soon as it has discharged completely; before it is given a chance to recharge in the negative direction; thus a switching-off action of tube V2, and switching-on action of diode D3 is required at that very instant. This switching on-and-off action is achieved by a pulse voltage derived at the point when the capacitor C2 is discharged completely. When this alternate switching is performed, e.g., V2 is rendered inoperative and diode D3 is rendered operative, the capacitor C2 starts recharging in the positive direction in series with diode D3 and timing resistor R9; the value of R9 being preadjusted for the required timing of charge, as explained above. Here again, it is noted that the capacitor C2 is charged to a higher voltage (at cathode voltage terminal of tube V1) than the voltage at junction point between resistors R1 and R2, as done during *write* time. The reason is that, the capacitor C2 will charge linearly up to the voltage point as resides between resistors R1 and R2, and continue thereon exponentially. But since it is only necessary for the capacitor C2 to charge up to the last said voltage point, a switching on-and-off action is again performed at this point, so that the diode D3 is rendered inoperative and the tube V2 is rendered operative, for repeat action of said charge and discharge of he capacitor C2. Thus it is seen that, by proper adjustments of the ratios of voltages developed across resistors R1 and R5, and by correct timing of said on-and-off switchings, the voltage charge across capacitor C2 may be made to rise and fall practically linearly during *read* period, and in exact coincident voltage values with that of the rising voltage developed during *write* period. Since the capacitor C2 may generally be chosen of high impedance value, the use of a cathode follower may be necessary for transferring the scanning voltages across capacitor C2 to an output device, for example, a magnetic deflection coil utilized with a cathode ray storage tube. Such an arrangement is shown by the application of the voltage across capacitor C2 upon the control grid of cathode follower tube V3, which has series-connected cathode circuit resistors R12 and R13. The junction terminal between resistors R12 and R13 is connected to the control grid of driver tube V4, the anode current of which energizes the beam deflection coil L1 of a storage tube to be described later. The cathode of V4 is connected to a positive potential across battery B3, in series with resistor R14, so as to obtain normal negative bias upon its control grid from the junction point between resistors R12 and R13, in consideration with the positive potential that normally exists at this junction point due to cathode follower action of tube V3. The negative bias upon the control grid of tube V4 is adjusted for minimum current flow through its anode circuit, and the cathode circuit resistor is adjusted to the required gain of said tube. In order to apply a steady state reference current through the beam deflection coil L1, for normally deflecting the beam of said storage tube (to be described later) to one edge of the storage screen, as a reference starting point of said scanning, a battery B4 is connected across L1 in series with a resistor R15; the steady state current through coil L1 being in opposing direction to the current flow through driver tube V4. Of course, a magnet may be substituted for the battery B4 and resistor R15; the circuit being shown only as an exemplary arrangement.

The on-and-off switching operations of diodes D2, D3 and tube V2 may be established several different ways, for example, a multivibrator may be put into operation during *read* period, so as to act upon D2 and V2 for the proper sequence of their on-and-off states; the frequency of said multivibrator being preadjusted for accurate coincidence of their switchings at the minimum and maximum voltages residing at the junction points between resistors R1, R2 and R4, R5, respectively. Such switching may also be accomplished by high speed mechanical relays, taking place of the diode D3 and tube V2, under control of said multivibrator. For automatic timing of these switching sequences, however, a simpler arrangement may be desirable, as shown in the arrangement of FIG. 1.

The capacitor C2 is coupled to the voltage residing at the junction point between resistors R2, R3 in series with diode D4 and resistor R16. The diode D4 is so polarized that current flows through it, and through R16, only when the rising voltage across C2 exceeds the voltage at junction point of the resistors R2 and R3. Accordingly, a voltage pulse is developed across resistor R16 when the time sequence of switching of diode D2 arrives; the pulse of which may be utilized for said switching. It will be noted that the diode D4 should actually be connected to the junction point between resistors R1 and R2, but because the generation of said pulse takes place after the rising voltage across C2 has reached the critical voltage, and thereby causing a slight delay, the voltage developed across resistor R2 hastens this delay for the proper timing coincidence. The capacitor C2 is similarly coupled to the residing potential at the junction point between resistors R3 and R4 in series with diode D5 and resistor R17. In this case, the diode D5 is so polarized that current flows through it, and through R17, when the capacitor charge assumes a negative potential with respect to the potential residing at last said junction point. Thus when the charge across capacitor C2 discharges and reaches below the potential at junction point between resistors R3 and R4, a current flows through diode D5 and resistor R17, causing a pulse voltage developed across R17, which, as described above, is utilized for the switching off of tube V2. As in the previously described mode, a delay in the generation of said switching pulse is inherent, and accordingly, the resistor R4 is included, so that the voltage developed across it will hasten the generation of said pulse voltage for the proper switching-off coincidence.

For the on-and-off switching of diode D3 and tube V2, the pulses generated across resistors R16 and R17 are separately amplified by amplifiers 13, 14, respectively, and applied in negative polarities to the second control grids of dual control grid tubes V5, V6, respectively, across load resistors R18 and R19, respectively. The tubes V5 and V6 constitute a flip-flop trigger circuit, comprising plate load resistors R20, R21, and direct cross-coupling capacitors C3 and C4. The function of this flip-flop circuit is that, the capacitors C3 and C4 charge to the plate supply potential of B5, through diodes D6 and D7, and thus causing zero bias application upon the first control grids of V5 and V6. The first control grids of tubes V5 and V6 are at floating potentials without load impedances, so that the charge across capacitors C3 and C4 remain undisturbed; except in series with the internal grid to cathode capacitances of tubes V5 and V6; such loss, however, is regained by the alternate operation of the trigger. Diodes D6 and D7 may also be eliminated, as the grid currents of V5 and V6 are capable of charging the capacitors C3 and C4; except when these capacitors are so large that the prolonged grid currents may burn out the tubes.

In operation, the current gain of one of the tubes V5, V6 will inherently be larger than the other, and will initially apply a regeneratively large negative bias upon the control grid of the other tube, thus cutting off its conductance and rendering itself conductive in a stable state. When a negative pulse is applied to the second control grid of the conductive tube, however, the cut-off bias upon the first control grid of the non-conductive tube is raised toward cathode potential, and consequently, it applies a regeneratively large negative bias upon the first control grid of the conductive tube; thus reversing the conductance of the flip-flop circuit. The alternate reversal of this flip-flop circuit is accordingly established by alternate application of the output negative pulses from amplifiers 13 and 14 to the second control grids of tubes V5 and V6, respectively. The first control grids of tubes V5 and V6 are directly connected to the control grids of tubes V7 and V8, respectively, so that on-and-off conductance of these latter tubes vary in harmony with the former tubes. The on-and-off switchings of diode D3 and tube V2 are then established by the on-and-off conductances of tubes V8 and V7, respectively, for example, when V8 is conducting, its anode element draws current in series with resistor R9, and assuming R9 to be of large value, the anode terminal of diode D3 becomes highly negative and renders it inoperative. Similarly, when tube V7 is conducting, its anode element draws current through resistor R11 and develops a negative cut-off bias voltage upon the control grid of tube V2.

Up to this point, the alternate switchings for the production of alternate *read* scanning waves had been described. During *write* period, however, D2 must be rendered operative; D3 and V2 must be rendered inoperative; and the flip-flop circuit comprising V5 and V6 must remain idle with a predetermined state of conductance. Idleness of the flip-flop is established by the conductance of tube V9 (during *write* period), the anode element of which is directly connected to the anode element of V5, so that no matter how negatively the second control grid of V5 is driven, a large negative cut-off bias is always applied to the first control grid of V6, from across resistor R20. In this state of idleness of the flip-flop circuit, the tube V7 conducts and renders V2 inoperative by drawing current through resistor R11. Since V8 is now non-conductive and unable to render diode D3 inoperative, the tube V10 is employed as a supplement which conducts during said *write* period, and the anode of which is directly connected to the anode of V6, to complete said switching operation. Also during said *write* period, the tube V11 becomes non-conductive, so that it does not draw current through resistor R8, and accordingly, diode D2 remains operative for the charging of capacitor C2.

The on-and-off operations of tubes V9, V10 and V11 are controlled by a flip-flop trigger circuit comprising tubes V12, V13 and driver tubes V14, V15. The operation of this flip-flop circuit is somewhat different than the operation of flip-flop comprising tubes V5 and V6, although their basic principles of operation are similar. The anode element of tube V12 is connected to the supply voltage of B5 in series with resistor R22, and the anode element of tube V13 is connected to the supply potential of B5 in series with resistor R23. The anode element of V12 is directly coupled to the control grid of V13, and the anode element of V13 is directly coupled to the control grid of V12; said control grids being floated without load impedances. Thus the capacitors C5 and C6 will charge equal to the supply potential of B5, by way of initial current draw through said control grids, and the voltages across C5 and C6 will act as zero bias upon said control grids. But due to cross coupling, one of the tubes, V12 or V13, must conduct and the other be non-conductive. The flip-flop action is performed by the driver tubes V14 and V15, by directly connecting their anode elements to the anode elements of tubes V12 and V13, respectively. The control grids of driver tubes V12 and V13 are normally biased to anode cut-off current. Thus assuming that V13 is conducting and V12 is non-conducting, a positive pulse upon the control grid of driver tube V14 will render it conductive and draw current through anode circuit resistor R22. This current draw will cause a negative voltage applied to the control grid of conductive tube V13 to a point where the currents of tubes V12 and V13 balance. A further negative drive upon the control grid of V13 will cause a sudden regeneration, and tubes V12, V13 reverse their states of conductance. Thus it is seen that by alternate positive pulses applied upon the control grids of driver tubes V14 and V15, in the proper *write* and *read* sequence from input terminals (*a*) and (*b*), and by directly connecting the control grids of tubes V12, V13 to the control grids of V11, V10, and V9, as shown, the proper on-and-off switchings of diodes D2, D3 and V2 can be established.

The charge and discharge waveform of the capacitor C1 had been illustrated by the graphical drawing at B in FIG. 1. As described in the foregoing, the positive rising voltage across C1 (wave 7 at B) is established in series with diode D1 and resistors R6, R7. When the charge across C1 has risen to the maximum at the end of *write* period, further charge must stop, and retain said charge in steady state during the *read* period, as shown by the wave 8 at B. This steady state condition is achieved by the tube V16, the control grid of which is directly connected to the control grid of tube V12, so that the on-and-off conductance of V16 varies in harmony with the tube V12. Thus when the writing period is ended, tube C16 becomes conductive and draws current through R7, and assuming R7 to have large resistive value, the voltage to the anode terminal of D1 becomes highly negative and stops further charge of capacitor C1.

When the capacitor C1 is to be recharged to a new value, such as shown by the rising wave 11 at B, it must be first discharged rapidly, such as shown by the vertical wave 9 at B. This fast discharge of capacitor C1 is achieved by tube V17, the control grid of which is normally biased to anode current cut-off point. At the required time period of said discharge, a positive pulse is applied upon the control grid of tube V17, which becomes temporarily conductive and draws anode current in series with the capacitor C1; bias battery B1; resistor R5; and plate supply battery B5. Here it will be noted that no matter what the voltage value in capacitor C1 and the bias voltage of battery B1 is, the anode current of tube V17 will pass through high plate supply voltage of battery B5, and assuming a low resistive value of R5, a very high anode current of tube V17 can be established throughout the discharging pulse period; thus causing a very sharp discharge of capacitor C1. Due to said constant conductance of tube V17, the capacitor C1 will first discharge to zero value, and recharge again in the negative polarity. In order to prevent this negative charge, a polarized diode D8 is connected in parallel with capacitor C1. With such an arrangement, it is possible to achieve fast discharge across a large capacitor. Thus by choosing a very large value for capacitor C1, the cathode follower V1 may be eliminated, and the resistors R1 through R5 substituted by C1 having the required capacitance-dividing terminal taps.

In reference to the graphical waveform at B in FIG. 1, the discharge period 9 of capacitor C1 may be just before the *write* charging wave 11 starts, in which case, the positive pulse upon control grid tube V17 may be obtained from the anode circuit of tube V12 through a small differentiating capacitor. But if said discharge is preferred to be established at 9, just before said waiting period 10, as shown in the drawing of B, then the discharging pulse upon the control grid of tube V17 is derived from another tube, to be described further.

Figure 2:
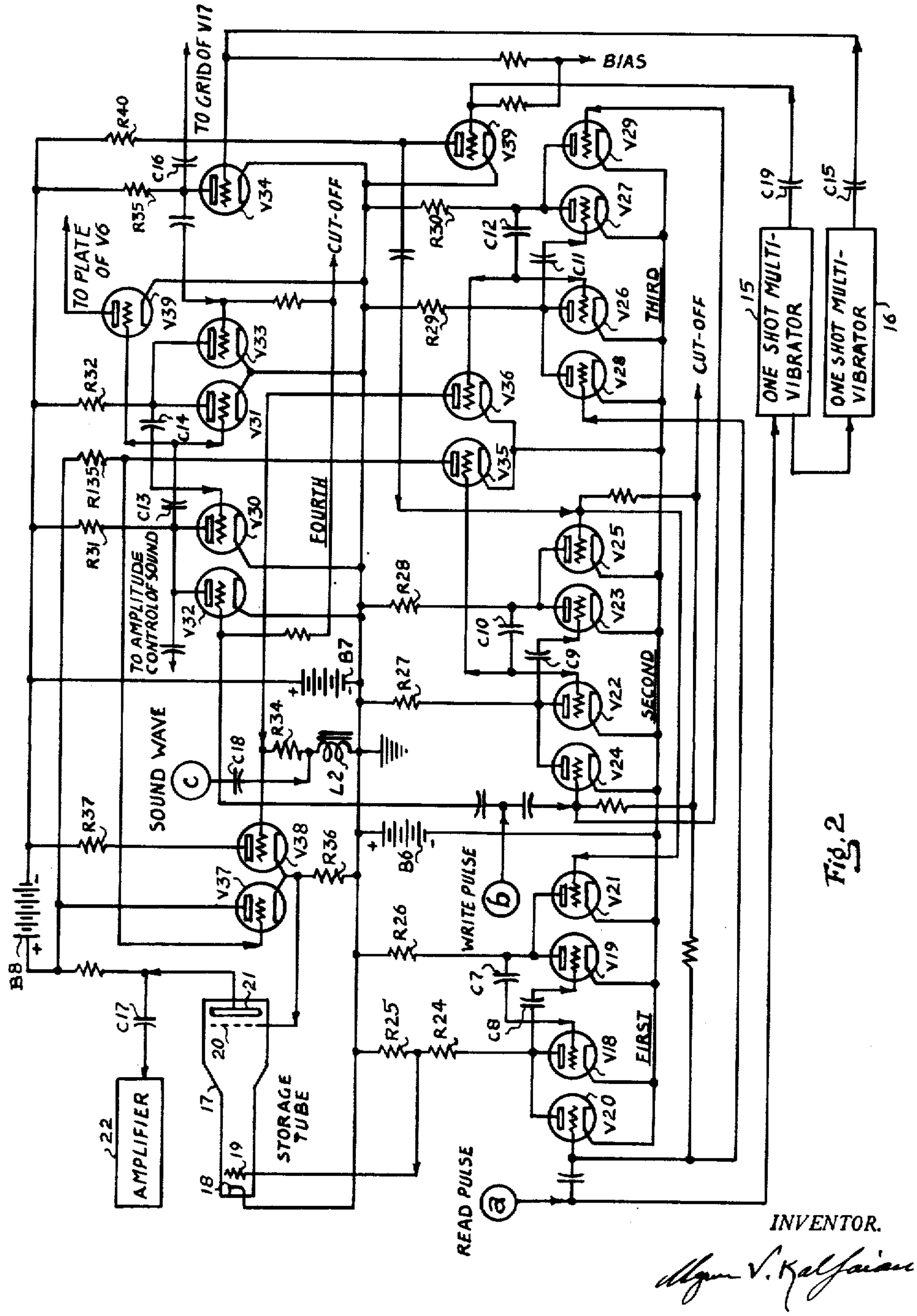

FIG. 2 is an arrangement for counting the *read* saw tooth waves to a predetermined number, and also for the operation of a storage tube in a prescribed sequence. The arrangement comprises mainly a number of flip-flop circuits, and a counting arrangement which may either comprise a conventional ring counter, or a single shot multivibrator circuit acting as a delay circuit. The flip-flop circuits utilized are of the type described by way of trigger tubes V12, V13, and driver tubes V14, V15, and accordingly, functional description of each of the flip-flop circuits in FIG. 2 will be omitted. Their arrangements, however, are as follows: The first flip-flop (sequence of the flip-flops being indicated in the drawing) circuit consists of trigger tubes V18, V19, and driver tubes V20, V21; the anode circuit resistor of V18 being series-connected resistors R24, R25, and the anode circuit resistor of V19 being R26; and the anode to grid cross-coupling capacitors being C7 and C8. The second flip-flop circuit consists of trigger tubes V22, V23, and driver tubes V24, V25; the anode circuit resistors of V22, V23 being R27, R28, respectively; and the anode to grid cross-coupling capacitors being C9 and C10. The third flip-flop circuit consists of trigger tubes V26, V27, and driver tubes V28, V29; the anode circuit resistors of V26, V27 being R29, R30, respectively; and the anode to grid cross-coupling capacitors being C11 and C12. The fourth flip-flop circuit consists of trigger tubes V30, V31, and driver tubes V32, V33; the anode circuit resistors of V30, V31 being R31, R32, respectively; and the anode to grid cross-coupling capacitors being C13 and C14. The saw tooth wave counting device consists of two single shot multivibrators, as shown by the block diagrams 15 and 16. A single shot multivibrator consists of a delay circuit, which when excited by an input pulse, it changes its state of conductance suddenly and remains in such state for a predetermined length of time before it sharply returns to its former state of conductance; the length of said delay being predetermined by the value of a timing capacitor used therein. Circuitry of single shot multivibrators have been shown in various literature of electronics, and used conventionally. Accordingly, further detailed specification is not found necessary herein. The particular function for the purpose given herein, however, is as follows:

When a positive *read* pulse arrives at terminal (*a*), it is applied upon the single shot multivibrator 15, which being adjusted to respond only to positive pulse, operates and prolongs this operated state during the prespecified time period within which a certain number of readings of a written wave pattern are to be made. When the circuit of block 15 returns to its normal operating state, it produces a positive pulse and applies upon the input of single shot multivibrator block 16 for operation. The time delay of block 16 is preadjusted to be short, for example, just long enough for erasure of a written wave pattern on the storage surface of a particular storage tube used. Thus when block 16 returns to its normal operating state, it produces an output negative pulse (by phase inversion) and applies upon the control grid of amplifier tube V34 by way of differentiator coupling capacitor C15. This negative pulse is amplified in the anode circuit resistor R35 in positive polarity, and further applied by way of coupling capacitor C16 to the control grid of discharger tube V17 (in FIG. 1) for its operation and discharge of capacitor C1, as previously described.

Various types of storage devices have been devised, and the cycle of operation of one particular type will be briefly described herein as a typical example. The simplified diagrammatic drawing of 17 represents a storage tube of the cathode ray type. The functional parts of this tube are: a cathode 18; a beam-current intensity control element 19; a signal storage screen 20; and an output target 21, from which a written signal on the storage screen is read across an output load resistor R33. Due to the very low amplitude of signal derived from storage devices of this type, the output signal across R33 is further amplified by block 22 through coupling capacitor C17. The operating cycles of storage tube 17 may be as follows: During *write* period, the voltage upon control element 19 is made zero with respect to the cathode element 18, and the voltage upon storage screen 20 is biased to 10 volts positive, so this bias voltage can be modulated by the sound wave pattern during scansion of the cathode beam across the storage screen. During *read* period, the control element 19 is negatively biased, and the voltage upon storage screen 20 is lowered to zero value. During *erase* period, the negative bias upon control element 19 is raised to zero value, and the voltage upon storage screen 20 is raised to several hundred volts positive, so that secondary emission from the storage screen by the scanning cathode beam will erase the stored signal. These various cycles of multiple switching and voltage level shifting are performed by the various flip-flop circuits in FIG. 2, and their sequence of operation may be described as in the following:

During *write* period, assume first that tube V18 of the first flip-flop is non-conducting, and accordingly, the control element 19 of the storage tube receives zero bias. When a positive *write* pulse arrives at (*b*), the tube V22, V27 and V30 of the second, third and fourth flip-flops, respectively, become in conductive states. The control grid of tube V35 is directly connected to the control grid of conductive tube V22, and the control grid of tube V36 is directly connected to the control grid of non-conductive tube V26, so that V35 becomes conductive and V36 non-conductive. Here it will be noted that the plate supply potential for the first, second and third flip-flop circuits is received from battery B6, which is below the ground potential, and the fourth flip-flop circuit receives its plate supply potential from battery B7, which is above the ground potential. The cathode terminals of tubes V35 and V6 are connected to the negative terminal of battery B6, so that the anode element of tube V36 receives its supply positive potential from battery B6 in series with R34 and inductance L2, while the anode element of V35 receives its supply positive potential from the series connected batteries B6, B7 and B8, in series with resistor R135. Thus when tube V35 is conducting, it draws current through resistor R135 and applies a large negative bias upon the control grid of tube V37; rendering it inoperative. Since at this time the tube V36 is inoperative, the control grid of tube V38 is at ground potential, and its negative bias depends upon the amount of current flow through the cathode circuit resistor R36, for example, 10 volts, as necessary for the storage screen of tube 17. This voltage may be adjusted by either the cathode circuit resistor R36, or in combination with plate circuit resistor R37. Since now the tube V38 is conducting, the sound wave pattern arriving from terminal (*c*) upon the control grid of tube V38, through coupling capacitor C18, is transferred to the cathode circuit resistor R36, and thereby applied upon the storage screen 20 of tube 17, for writing of the sound wave. When a *read* positive pulse arrives at terminal (*a*), tubes V18 and V26 of the first and third flip-flops, respectively, become conductive. The control element 19 of storage tube 17 receives a negative base by way of current flowing through resistor R25, and V36 becomes conductive to draw current through resistor R34, so as to render tube V38 non-conductive, and consequently drop the voltage across resistor R36 to zero value, for said reading function of the written signal. Simultaneously, a positive pulse is applied upon the input terminal of single shot multivibrator 15, for initiating the time delay circuit that is to take place for a predetermined length of reading time period. When the operated one shot multivibrator 15 returns to its normal operating state, it applies a positive pulse to the input of one shot multivibrator 16 for initiating a delay pulse, and it also applies a negative pulse to the control grid of tube V39 through coupling capacitor C19. This latter pulse is amplified in positive polarity across anode circuit resistor R40 of amplifier tube V39, and applied simultaneously upon the control grids of driver tubes V21 and V25, causing the trigger tubes V19 and V23 of the first and second flip-flops conductive. In this state of operation, the control element 19 of storage tube 17 assumes cathode potential, and V35 becomes non-conductive (due to direct connection of its control grid with the control grid of non-conductive trigger tube V22) to remove the high negative potential upon the control grid of tube V37. This latter tube draws high current through the cathode circuit resistor R36, and raises about 400 volts positive across it for the application upon the storage screen 20. At this point the *read* scanning wave still continues, and accordingly, the signal storage upon screen 20 is erased by secondary emission. After one or two scanning waves, the one shot multivibrator 16 regains its original state of operation, and produces an output negative pulse which is applied upon the control grid of amplifier tube V34 through coupling capacitor C15. This pulse is amplified in positive polarity across anode circuit resistor R35 and applied upon the control grid of driver tube V33 of the fourth flip-flop circuit; causing trigger tube V31 to assume a stable conductive state. The control grid of V31 is directly connected to the control grid of tube V39, causing it conductive, and because its anode element is directly connected to the anode element of trigger tube V6 in FIG. 1, it stops the operation of the flip-flop circuit comprising tubes V6 and V5. Thus the reading cycle ends, and the arrangement waits during the period 4 of the graphical illustration at A, in FIG. 1, until another writing wave pattern of the sound arrives. As explained previously the discharge of capacitor C1 may either be effected just before the writing starts, or after the erase action has ended. In the latter case, the discharging positive pulse upon the control grid of discharger tube V17, in FIG. 1, is applied from the anode circuit resistor R35 of amplifier tube V34, through coupling capacitor C16. Since this discharging positive pulse is the starting point of a waiting period for the arrival of a following wave pattern of the voice sound, this pulse may also be utilized to control the amplitude of the incoming sound wave, such as described in my Patent No. 2,708,-688, and pending applications Ser. Nos. 723,510 and 773,065. The purpose of such amplitude control is to produce each wave pattern in constant predetermined amplitude, so the amplitude ratios of sets of resonances in phonetic sounds may be distinguished more accurately during analysis of same. This pulse signal may be taken either from the anode circuit of V34, or from the anode circuit of V30; the latter being shown in drawing of FIG. 2. If negative pulse is required for this purpose, then the pulse signal may be taken from the anode circuit of V31.

The switching arrangement of FIG. 2 has been given as an exemplary form, and different switching arrangements may be necessary with the utilization of storage devices of different types, for example, the use of pick-up storage tube WX-3989 called "Permachon" will require lesser cycles of switching than described above. Accordingly, the arrangement of FIGS. 1 and 2 are given only as exemplary forms embodying the invention, and various modifications, substitutions, and adaptations for various purposes and applications, for example, the scanning system described herein may be readily adapted to narrow band speech transmission by shifting the high frequency components of the propagated speech to low frequency regions prior to transmission to a remote apparatus through space or wire links, may be made without departing from the spirit and scope of the invention.

Various vacuum tubes used in FIGS. 1 and 2 may be substituted by transistors, or, the complete arrangement may be transistorized, one exemplary arrangement of which is shown in FIG. 3. For simplicity of explanation, it is first asumed that the waveform graphically illustrated at C is already produced across tapped resistor R41. The nature of this waveform had been explained in the foregoing by way of graphical illustration at B in FIG. 1, and therefore, further explanation is not necessary. The polarity of waveform C acoss R41 is such that, the terminal end 23 becomes positive with respect to the tap 24, and the terminal end 25 becomes negative with respect to said tap. The terminal end 23 of R41 is directly connected to the base element of an NPN emitter follower transistor Q1, and the terminal end 25 is directly connected to the base element of an PNP emitter follower transistor Q2; thus transforming a high impedance of R41 into a low impedance resistor R42, across which appears a replica current of the waveform C. The emitter circuit impedance consists of series-connected resistors R43, R44 and R45, but the closed circuit is formed by a unijunction transistor Q3, and PNP transistor Q4, both of which are normally inoperative, and thereby the emitter element of Q2 may normally be considered as open circuit.

Across the emitter circuit resistor R42 there are included series-connected component parts comprising a unijunction transistor Q5; series-connected resistors R46, R47; and NPN transistor Q6. Also in the same fashion, there are connected a unijunction transistor Q7; resistors R48, R49; and NPN transistor Q8.

In operation, assume initially that Q5 through Q8 are inoperative. Also assume that the *write* current starts rising across resistor R42 in series with emitter follower Q1, and that a *write* pulse operates the trigger circuit in block 26, which in turn drives the NPN transistor Q9 inoperative, and NPN transistor Q10 conductive, the latter of which draws current through resistor R50 and renders Q11 inoperative. The base element of NPN transistor Q6 receives positive bias from bias battery B9, in series with resistor R51, and draws current in series with resistors R46, R47 and unijunction transistor Q5, the latter of which is forward biased by the emitter being connected to the second base in series with resistor R52. Thus a shunt circuit being formed by Q5 and Q6, and due to constant current characteristics of these transistors, a proportional voltage rise appears across series-connected resistors R46 and R47, in harmony with the rise in voltage across resistor R42. The rising voltage appearing at the junction point between resistors R46 and R47 is directly applied upon the capacitor C22, across which will appear the final scanning waveforms. The positive bias battery B10 is adjusted equal to the steady state voltage that appears across resistor R42, due to minimum current flow through the emitter follower transistor Q1, so that the capacitor charging voltage will start from zero value.

When a *read* pulse from terminal (*a*) arrives upon the trigger circuit in bloc 26, it reverses its state of conductance and renders Q9 inoperative while rendering Q10 conductive; thus rendering Q11 conductive for reverse biasing Q5, by drawing current through resistor R52, and cutting off its conductance by rendering Q6 inoperative. At this instant, the *read* pulse at terminal (*a*) operates the trigger circuit in block 27, which renders NPN transistor Q12 conductive and NPN transistor Q13 non-conductive. The base element of PNP transistor Q14 receives positive cut-off bias from bias battery B11 in series with resistor R53, thereby rendering itself inoperative and offering forward bias to the unijunction transistor Q3 by removing current draw through resistor R54. The conductive Q12 draws current through resistor R55, and the negative voltage developed across it offers forward bias upon the emitter element of PNP transistor Q4, the latter of which opens the gate to unijunction transistor Q3 for conductance, in series with resistors R43 to R45. The positively charged capacitor C22 is now connected to the negative voltage at the junction point between resistors R43 and R44, in series with timing resistor R56. The capacitor C22 now starts discharging in series with resistor R56, the time constant depending upon predetermined value of said resistor, and of course, the capacitive value. The polarized battery B12 is adjusted to counteract the minimum direct current flow through the emitter follower transistor Q2. When the capacitor C1 discharges to zero voltage, it starts recharging in negative polarity. But in doing so, the base element of PNP transistor Q14 becomes negative in series with resistor R57, and its collector element draws current through resistor R58, offering forward bias to the NPN transistor Q15, which also starts drawing amplified current through its collector element in series with resistor R59. The amplified voltage in resistor R59 is regeneratively applied to the base element of Q14 through coupling capacitor C23, so that a very fast rise negative voltage (phase inverted if necessary) is applied from across resistor R59 to the input of trigger circuit in block 27, for reversing its state of conductance and shutting off the capacitor C22 from the negative potential at the junction point between resistors R43 and R44. The sharply amplified voltage from resistor R59 is also applied upon the trigger circuit in block, for reversing its state of conductance and act upon the transistors Q16 and Q17. In this case, Q16 becomes conductive and Q17 non-conductive. The Q16 draws current through resistor R60, driving Q18 non-conductive, and Q17 stops current draw through resistor R61, driving Q8 conductive. Thus the unijunction transistor Q7 becomes forward biased by the emitter element assuming the same potential as of the second base in series with resistor R62, and current flows in series with Q7, Q8 and resistors R48, R49. Since this last said series-connected circuit is connected in parallel with resistor R42, across which resides the maximum *write* voltage, the discharged capacitor C22 now starts charging to the voltage residing at the first base of Q7, in series with timing resistor R63; the value of this resistor being preadjusted for the required *read* scanning period. As the voltage across capacitor C22 rises and reaches (passing slightly) the voltage residing at the junction point of resistors R48 and R49, the NPN transistor Q19 becomes forward biased in series with resistor R64, and draws current through collector circuit resistor R65; the negative voltage developed across which further forward biases the PNP transistor Q20, causing current draw through its collector circuit resistor R66. The positive voltage developed across R66 is coupled to the base element of NPN transistor Q19, through coupling capacitor C24, causing a regenerative increase in current through the collector circuit resistor R66 of Q20. The sharply increased potential across this R66 resistor is coupled (phase inverted if necessary) to the trigger circuit in block 27, for altering its state of operation, and as described above, the charge of capacitor C22 now starts discharging through resistor R56; with alternate charge and discharge continuing thereafter.

As trigger circuits in blocks 27 and 28 continue altering their states of operation, during continuous *read* period, output pulses from trigger block 28 are applied upon a binary ring counter comprising flip-flop trigger circuits in blocks 29, 30, 31, 32 (or any predetermined number of triggers), for counting the number of *read* scanning saw-tooth cycles. After the number 32 block has operated, it applies an output pulse to reset the voltage across R41, for example, in a mode as explained by way of the arrangement in FIGS. 1 and 2, and the block 32 also applies an output pulse to the reset pulse generator circuit in block 33, which in turn resets the trigger circuit blocks 28 through 32, by way of isolating diodes D9 through D13, respectively. In the arrangement of FIG. 3 a ring counter had been used for counting the number of *read* scanning waves; but a time delay circuit, such as one shot multivibrator may be used, instead; as explained by way of FIG. 2.

If the capacitor C22 is chosen of high impedance, it may be found necessary to first use an emitter follower transistor Q21, before application of said capacitor's scanning voltage to the driver transistor Q22, for energizing the beam deflection coil L3 of a storage device suitable for the purpose. The circuit arrangement of FIG. 3 had been given to describe the principles of operation for producing the specific type of *write* and *read* scanning waveforms, and as is practiced in the art of electronics, the modes of semiconductor switchings are plural, and accordingly, the circuitry of FIG. 3 may be revised in various ways that come within the scope of the invention.

In reference to the arrangements of FIGS. 1 to 3, various modes of switchings have been employed; these switchings being achieved by vacuum tubes, diodes and transistors. These switching conditions could be achieved ideally by mechanical relay contacts, as these would offer the lowest impedance paths electrically. While the speed of operation of mechanical relays cannot be compared with the speed of electronic relays, various advancements have been made in the design of mechanical relays. For example, an ultra high speed mechanical relay that will operate in 200 microseconds is available commercially, for example, as manufactured by Stevens-Arnold Inc. Such speed of operation is satisfactory in certain functions of the arrangements given in FIGS. 1 to 3, and accordingly, the arrangement of FIG. 4 is included herein to show the preferred embodiments of the invention without involving limitations thereof.

In FIG. 4, the series-connected capacitors C25 and C26 are charged in series with diode D14 and resistors R67, R68 to the potential of battery B13; and capacitor C27 is charged in series with diode D15 and resistors R69, R70 to the potential of battery B14. The on-and-off gatings to these capacitors, for charging and idling conditions, are achieved by applying large gating voltages at the junction points between resistors R67, R68 and R69, R70, for example, a high positive voltage at the junction point between resistors R67, R68 will cut off current flow through diode D14, and a high negative voltage at the junction point between resistors R69, R70 will cut off current flow through diode D14. Thus by rendering diodes D14 and D15 conductive simultaneously, the capacitors C25, C26 will charge to the peak positive potential of battery B13 in series with resistors R67, R68, and capacitor C27 will charge to the peak negative potential of battery B14 in series with resistors R69 and R70. When the diodes D14 and D15 are simultaneously rendered inoperative, the stored charges across these capacitors will remain constant thereafter, without dissipation.

Functionally, assume that during the charging period of capacitors C25 to C27, the contact points 34, 35 of relay RY1 are closed; the contact points 36, 37 of relay RY2 open, and the contact points 38, 39 of relay RY3 are open. The closed contact points 34 and 35 shunt the capacitor C28 (much smaller than the capacitors C25, C26 and C27) in parallel with the capacitor C25; the former assuming a similar charge as of the latter. At the end of said charging when the diodes D14 and D15 are rendered inoperative simultaneously, the said charges will remain constant and undisturbed. At this time, assume that the relay RY1 is deenergized, releasing the contact points 34, 35, and the relays RY2, RY3 energized alternately at a preadjusted frequency; making contact points 36, 37 and 38, 39 close and open alternately. When contact points 38 and 39 close (contact points 36, 37 being open), the positive charge across capacitor C28 now starts discharging to zero, and to continue thereon to the negative potential across C27 in series with the timing resistor R71. Similarly, when contact points 36 and 37 close (contact points 38, 39 being open), the capacitor C28 charges to the peak positive potential of series connected capacitors C25 and C26 in series with the timing resistor R72. The frequency of alternate switching of the relays RY2 and RY3, as well as the values of timing resistors R71 and R72, are so preadjusted that, the contact points 36 and 37 are opened at the exact coincident point when the charging potential across capacitor C28 reaches the potential level residing at the junction point between the capacitors C25 and C26, while the contact points 38 and 39 open at the exact coincident point when the capacitor C28 has discharged to zero value. Thus by preadjusting the capacitive values of C25 to C27, only the linear portions of rise and fall of the capacitor C28 may be utilized for producing symmetric saw tooth waves; of course, the resistance values of R63 to R70 also being preadjusted, so that the rising potentials across capacitors C25 to C27 will be within the linear curvature during the longest time period that a wave pattern of the recorded sound may occur.

The alternate operation of relays RY2 and RY3 may be accomplished in various conventional modes, for example, a multivibrator may be used. The arrangement of FIG. 4, however, shows the simplest mode, and it comprises a sine wave oscillator 40, having an output transformer of primary L3, and a center tapped secondary each half consisting of L4 and L5. The secondary L4 is coupled to the coil of relay RY3 through rectifying diode D16, and the secondary L5 is coupled to the coil of relay RY2 through rectifying diode D17, so that each relay receives current only during alternate half cycle period of the oscillatory sine wave. The resistor R73 is shown as a peak current limiter of the sine wave, and also, it may serve to balance out the on-and-off timing periods of the relay contact points. It is inherent in mechanical relays that the operating (closing) time period of the contact points is shorter than the release time period. Thus by varying the value of resistor R73, the threshold operating time period may be delayed to equal the release time period after voltage in the secondary coils L4 and L5 has crossed through zero value. Of course, a separate delay adjusting resistor for each relay may be used, if the operating characteristics of each relay is different. Also, the secondary coils L4 and L5 may be split for properly phasing the operations of relays RY2 and RY3. Further yet, a separate diode may be connected in parallel with each relay (RY1 to RY3) as a reverse surge clamp. The operation of oscillator 40 is stopped during *write* period, and started during *read* period.

The on-and-off switchings of capacitors C25 to C27 are accomplished by the following arrangement: The cathode element of V40 is directly connected to the junction point between capacitor C27 and diode D15; the cathode element of V41 is connected to the junction point between timing resistors R69 and R70, the anode elements of V40 and V41 being connected to the positive terminal of battery B13; the anode element of V42 is connected to the junction point between diode D14 and storage capacitor C26; the anode element of V43 is connected to the junction point between timing resistors R68 and R67; the anode element of V44 is connected to the control grid of V40, the latter being coupled to the anode element through a load resistor R74; and the anode element of V45 is connected to the control grid of V41, the latter of which is coupled to the anode element through a load resistor R75, and the cathode elements of V42 through V45 being grounded. The control grid of tube R75 being normally connected to its anode element through resistor R75, draws a large current through resistor R70 and applies cut-off positive bias upon the cathode element of diode D15; rendering it inoperative. The control grid of tube V40 being connected to the anode element through resistor R74, draws a large current and discharges any stored potential in capacitor C27; the polarized diode D18 preventing positive charge in said capacitor. The control grid of tube V42 is normally highly biased so as to render this tube inoperative. When a positive pulse is impressed upon the control grid of this tube, however, a high anode current passes and discharges the storage capacitors C25 and C26; the polarized diode D19 being used to prevent negative charge of these capacitors. Similarly, the discharger tube V40 is normally rendered inoperative by a high negative bias upon its control grid, which is produced by current flow through resistor R74 in series with the normally operating tube V44. When a negative pulse is impressed upon the control grid of tube V44, however, it becomes inoperative, and the grid of tube V40 assuming a positive voltage it operates and discharges capacitor C27; simultaneous positive and negative pulses being applied upon the control grid of discharger tubes V42 and V44, respectively.

The on-and-off operations of tubes V43 and V45 are accomplished by the flip-flop circuit comprising trigger tubes V46, V47, and driver tubes V48, V49. The anode element of driver tube V48 is connected in parallel with the anode element of trigger tube V46 with a common anode circuit resistor R76, and the anode element of driver tube V49 is connected in parallel with the trigger tube V47 with a common anode circuit resistor R77. These anode circuits are cross-coupled with the control grids of the trigger tubes by capacitors C29 and C30, the latter of which are floated and act as bias voltage storage elements, as described in the foregoing. During *write* period the grid of trigger tube V46 receives cathode potential and applies directly to the control grids of V45 and V50 for their operations (tube V50 energizing relay RY1 for closure of contacts 34 and 35), while during the same period the control grid of trigger tube V47 receives a high negative bias and transmits directly to the control grid of tube V43 to render it inoperative; the same negative bias being simultaneously applied to the oscillator block 40 to stop its oscillation. This switching condition reverses during *read* time period, as described previously. Of course, these electronic switchings may be substituted by mechanical switchings, if so desired.

As will be apparent to the skilled in the art, the arrangement and operation of FIG. 5 may only be considered as exemplary, and not exhaustive. As an example, a rotary disk or a drum having segmented contact terminals with wiper brushes may just as well serve for the purpose contemplated herein. Accordingly, the invention in its broader sense will only be determined by the claims appended hereto.

What I claim is:

1. In a frequency conversion system where a complex wave is recorded during an unknown time period and reproduced repeatedly during constant reference time base periods, and wherein phase variations of said complex wave during reproduction time is allowable, the system of producing frequency conversion scanning waveforms for recording said complex waves and reproducing same in symmetric forward and backward directions, comprising an impedance means; first and second resistor elements; means for producing across said impedance means a scanning voltage wave rising from a minimum amplitude reference level, the maximum level of said rising voltage representing the time dimension during which said recording will occur; means for holding the voltage across said impedance means constant after reaching said maximum; a first terminal tap at the maximum value of said impedance means; a second terminal tap at a predetermined value of said impedance means; first, second and third on-and-off gates; a storage capacitor means; means for coupling said first terminal tap to said capacitor means in series with said first resistor and said first gate; means for coupling said second terminal tap to the capacitor means directly through said second gate; means for shunting said capacitor in series with said second resistor and said third gate; means for operating said second gate in on-state while said first and third gates are in off-states during said rising voltage across the impedance means for charging said capacitor directly with similar rising voltage, representative of the recording scanning wave aforesaid; means for operating said first and third gates repeatedly and alternately while said second gate is in off-state during said holding voltage across said impedance means for discharging the capacitor in series with said third gate and second resistor, and charging it in series with said first gate and first resistor, the last said capacitance and resistance time constants being equal to the reference reproduction time base period aforesaid; and means for controlling the on-and-off operating time periods of said first and third gates such as to occur when the changing voltage across said capacitor is either equal to said minimum reference or to the voltage level at said second tap, thereby producing across said capitor the recording scanning wave and the converted reproduction scanning waves aforesaid.

2. In a frequency conversion system where a complex wave is recorded during an unknown time period and reproduced repeatedly during constant reference time base periods, and wherein phase variations of said complex wave during reproduction time is allowable, the system of producing frequency conversion scanning waveforms for recording said complex waves and reproducing same in symmetric forward and backward directions, comprising an impedance means; first and second resistor elements; means for producing across said impedance means a scanning voltage wave rising from a minimum amplitude reference level, the maximum level of said rising voltage representing the time dimension during which said recording will occur; means for holding the voltage across said impedance means constant after reaching said maximum; first and second end terminals from said impedance means; third and fourth terminal taps across the impedance means; a storage capacitor means having first and second terminals; first, second and third on-and-off gates; means for coupling the first and second terminals of said capacitor to the third and fourth terminal taps of said impedance means, respectively, in series with said first gate; means for coupling the first end terminal of said impedance means to the first terminal of said capacitor in series with said second gate and said first resistor; means for coupling the second end terminal of said impedance means to the first terminal of said capacitor in series with said third gate and said second resistor; means for operating said first gate in on-state while said second and third gates are in off-states during said rising voltage across the impedance means for charging said capacitor directly with similar rising voltage, representative of the recording scanning wave aforesaid; means for operating said second and third gates repeatedly and alternately while said first gate is in off-state during said holding voltage across said impedance means for discharging the capacitor in series with said third gate and said second resistor, and charging it in series with said second gate and first resistor, the last said capacitance and resistance time constants being equal to the reference reproduction time base period aforesaid; and means for controlling the on-and-off operating time periods of said second and third gates such as to occur when the changing voltage across said capacitor is either equal to said minimum reference or to the voltage level at said third tap, thereby producing across said capacitor the recording scanning wave and the converted reproduction scanning waves aforesaid.

3. The system as set forth in claim 2, wherein said means for controlling the on-and-off operating time periods of said second and third gates comprises a first unidirectional voltage-responsive means coupled from said first terminal of said capacitor to said third terminal tap of said impedance means, for producing a first signal pulse when the changing voltage in said capacitor is equal to the voltage at last said tap; a second unidirectional voltage-responsive means coupled from said first terminal of said capacitor to said fourth terminal tap of said impedance means, for producing a second signal pulse when the changing voltage in said capacitor is equal to the voltage at last said tap; and means for utilizing said first and second signal pulses for controlling said alternate operations of said second and third gates.

4. The system as set forth in claim 2, wherein said means for controlling the on-and-off operating time periods of said second and third gates comprises a first unidirectional voltage responsive means coupled from said first terminal of said capacitor to said third terminal tap of said impedance means for producing a first signal pulse when the changing voltage in said capacitor is equal to the voltage at last said tap; a second unidirectional voltage-responsive means coupled from said first terminal of said capacitor to said fourth terminal tap of said impedance means for producing a second signal pulse when the changing voltage in said capacitor is equal to the voltage at last said tap; a flip-flop trigger circuit having first and second operating input terminals; means for applying said first and second signal pulses to said first and second input terminals of said trigger for operating it in alternate states; and means for operating said second and third gates alternately by said alternately operated trigger circuit.

5. The system as set forth in claim 2, wherein is included means for counting said alternately produced scanning waves to a predetermined number; and means for shutting off the production of said last scanning waves after reaching said counted number, thereby reproducing all recorded complex waveforms at predetermined number of times, the same number of sampling pulses as produced during said recording time period; and means for reproducing said recorded pulses by said reproducing means at the frequency rate of said shifted sampling pulses, thereby effecting the shifting of resonances aforesaid.

6. The system as set forth in claim 2, wherein is included means for counting said alternately produced scanning waves to a predetermined number; means for shutting off the production of said last scanning waves after reaching said counted number, thereby reproducing all recorded complex waveforms at predetermined number of times; and means for producing a signal pulse after said count, which may be utilized for erasing said recorded complex wave.

7. The system as set forth in claim 1, wherein said first, second and third gates consist of the mechanical on-and-off contact points of relays, respectively.

8. The system as set forth in claim 1, wherein said impedance means comprises a second capacitor means, consisting of a series-connected capacitors with provision of said first and second terminal taps at the junction points of series-connections of last said capacitors.

9. The system as set forth in claim 2, wherein said first, second and third gates consist of the mechanical on-and-off contact points of relays, respectively.

10. The system as set forth in claim 2 wherein said impedance means comprises a second capacitor means, consisting of a series-connected capacitors with provision of said first and second end terminals, and said third and fourth terminal taps at the junction points of series-connections of last said capacitors.

11. In a frequency conversion system where a complex wave is recorded during an unknown time period and reproduced repeatedly during constant reference time base periods, and wherein phase variations of said complex wave during reproduction time is allowable, the system of producing frequency conversion scanning waveforms for recording said complex waves and reproducing same in symmetric forward and backward directions, comprising a resistor having a tap terminal and first and second end-terminals; means for producing across said first and second terminals a scanning energy wave rising from a minimum-magnitude reference level, the maximum level of said rising wave representing the time dimension during which said recording will occur; means for holding the maximum of said wave energy across said first and second terminals in constant state after reaching said maximum; first and second on-and-off operating semiconductor devices and a second resistor having a tap terminal and third and fourth end-terminals, all connected in series across said tap and first end-terminal of the first resistor, in a manner that the second resistor is left floating when said first and second semiconductor devices are simultaneously in off-operating states; third and fourth on-and-off operating semiconductor devices and a third resistor having a tap terminal and fifth and sixth end-terminals, all connected in series across said tap and first end-terminal of the first resistor, in a manner that the third resistor is left floating when said third and fourth semiconductor devices are simultaneously in off-operating states; fifth and sixth on-and-off operating semiconductor devices and a fourth resistor having a tap terminal and seventh and eighth end-terminals, all connected in series across said tap and second end-terminal of the first resistor, in a manner that the fourth resistor is left floating when said fifth and sixth semiconductor devices are simultaneously in off-operating states; a capacitor; fifth and sixth timing resistors; means for electrically connecting said capacitor directly to the tap terminal of said second resistor, and in series with said fifth and sixth resistors to the tap terminals of said third and fourth resistors, respectively; means for switching-off said on-and-off operating third, fourth, fifth and sixth devices during said rising wave energy in the first resistor, and switching-on the said first and second devices during said last period, thereby transferring said rising wave energy generated between tap terminal and first end-terminal of said first resistor to said capacitor in forward direction; means for switching off said first and second devices after said energy rise has stopped into said constant state, and means for simultaneously switching said fifth and sixth devices in on-operating states, thereby causing the stored energy in said capacitor to discharge gradually in backward direction in series with said fifth timing resistor; and means for switching said fifth and sixth devices in off-operating states, and said third and fourth devices in on-operating states at the instant when the energy in said capacitor has discharged completely, thereby restarting the rise of energy in said capacity for producing the repeated reproducing scanning energy wave aforesaid.

References Cited in the file of this patent

UNITED STATES PATENTS

| | | |
|---|---|---|
| 2,708,688 | Kalfaian | May 17, 1955 |
| 2,939,004 | Cole | May 31, 1960 |

OTHER REFERENCES

Publication: "Electronic and Radio Engineering"; Terman, Frederick E.; McGraw-Hill, 1955, 4th ed.